(12) United States Patent
Chang

(10) Patent No.: US 10,169,702 B2
(45) Date of Patent: Jan. 1, 2019

(54) METHOD FOR SEARCHING RELEVANT IMAGES VIA ACTIVE LEARNING, ELECTRONIC DEVICE USING THE SAME

(71) Applicant: HTC Corporation, Taoyuan (TW)

(72) Inventor: Edward Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 436 days.

(21) Appl. No.: 14/585,197

(22) Filed: Dec. 30, 2014

(65) Prior Publication Data

US 2015/0186425 A1    Jul. 2, 2015

Related U.S. Application Data

(60) Provisional application No. 61/921,539, filed on Dec. 30, 2013.

(51) Int. Cl.
*G06F 17/30* (2006.01)
*G06N 5/00* (2006.01)

(52) U.S. Cl.
CPC ....... *G06N 5/003* (2013.01); *G06F 17/30247* (2013.01); *G06F 17/30265* (2013.01)

(58) Field of Classification Search
CPC .............. G06N 5/003; G06F 17/30247; G06F 17/30265
USPC ........................................................ 707/729
See application file for complete search history.

(56) References Cited

U.S. PATENT DOCUMENTS

| 6,240,424 B1* | 5/2001 | Hirata | G06F 17/30253 382/305 |
| 8,190,604 B2* | 5/2012 | Wen | G06F 17/30247 707/732 |
| 8,199,979 B2* | 6/2012 | Steinberg | G06F 17/30247 340/5.53 |
| 8,649,572 B2* | 2/2014 | Gokturk | G06F 17/30253 382/118 |

(Continued)

FOREIGN PATENT DOCUMENTS

| CN | 101034415 | 9/2007 |
| CN | 101271476 | 9/2008 |

(Continued)

OTHER PUBLICATIONS

Nakazato, Munehiro, et al., "ImageGrouper: Search, Annotate and Organize Images by Groups", Visual 2002 / LNCS 2314, Springer-Verlag, Berlin, © 2002, pp. 129-142.*

(Continued)

*Primary Examiner* — Robert Stevens
(74) *Attorney, Agent, or Firm* — JCIPRNET

(57) ABSTRACT

The present disclosure provides a method, an electronic device, and a user interface for searching a plurality of relevant via active searching. At first, a query image having a first subject and a second subject may be obtained from stored images. Next, a query concept based on content information of the query image may be learned by sampling first sample images from the stored images according to content information of the query image for relevance feedback. Then, the query concept is refined based on context information of the first selected images among the first sample images. Based on the refined query concept, relevant images among the stored images may be searched according to the query concept and grouped into a collection album.

19 Claims, 12 Drawing Sheets

(56) References Cited

U.S. PATENT DOCUMENTS

| | | | | |
|---|---|---|---|---|
| 9,171,018 B2* | 10/2015 | Ovsjanikov | ....... | G06F 17/30277 |
| 9,489,431 B2* | 11/2016 | Raichelgauz | .......... | H04H 60/46 |
| 2003/0195883 A1* | 10/2003 | Mojsilovic | ........ | G06F 17/30256 |
| 2004/0111465 A1* | 6/2004 | Chuang | ................... | H04L 29/06 |
| | | | | 709/203 |
| 2004/0135815 A1* | 7/2004 | Browne | ............ | G06F 17/30274 |
| | | | | 715/810 |
| 2005/0131951 A1* | 6/2005 | Zhang | ............... | G06F 17/30256 |
| 2007/0067295 A1* | 3/2007 | Parulski | ............ | G06F 17/30265 |
| 2007/0177805 A1* | 8/2007 | Gallagher | ......... | G06F 17/30265 |
| | | | | 382/190 |
| 2007/0239683 A1 | 10/2007 | Gallagher | | |
| 2007/0286531 A1* | 12/2007 | Fu | ..................... | G06F 17/30277 |
| | | | | 382/305 |
| 2009/0034805 A1* | 2/2009 | Perlmutter | ........ | G06F 17/30256 |
| | | | | 382/118 |
| 2011/0072048 A1* | 3/2011 | Hua | .................. | G06F 17/30265 |
| | | | | 707/780 |
| 2011/0268323 A1* | 11/2011 | Gallagher | ......... | G06F 17/30265 |
| | | | | 382/118 |
| 2012/0183206 A1* | 7/2012 | Tan | ...................... | G06K 9/6215 |
| | | | | 382/159 |
| 2012/0203764 A1* | 8/2012 | Wood | ................ | G06F 17/30247 |
| | | | | 707/722 |
| 2012/0304125 A1* | 11/2012 | Gokturk | ............ | G06F 17/30253 |
| | | | | 715/825 |
| 2013/0039547 A1* | 2/2013 | Liu | .................... | G06K 9/00288 |
| | | | | 382/115 |
| 2013/0055079 A1* | 2/2013 | Liao | .................. | G06F 17/30265 |
| | | | | 715/701 |
| 2013/0080426 A1* | 3/2013 | Chen | ................. | G06F 17/30247 |
| | | | | 707/723 |
| 2013/0129231 A1* | 5/2013 | Dale | .................... | G06K 9/6254 |
| | | | | 382/224 |
| 2013/0151510 A1* | 6/2013 | Hua | .................. | G06F 17/30265 |
| | | | | 707/723 |
| 2013/0170738 A1* | 7/2013 | Capuozzo | ......... | G06F 17/30265 |
| | | | | 382/159 |
| 2014/0046914 A1* | 2/2014 | Das | ................... | G06F 17/30247 |
| | | | | 707/694 |
| 2014/0193087 A1* | 7/2014 | Conwell | .......... | G06F 17/30265 |
| | | | | 382/224 |
| 2014/0219566 A1* | 8/2014 | Rodriguez | ........ | G06F 17/30265 |
| | | | | 382/190 |
| 2014/0270550 A1* | 9/2014 | Dwan | ................ | G06K 9/00684 |
| | | | | 382/225 |
| 2014/0341476 A1* | 11/2014 | Kulick | ................ | G06K 9/6267 |
| | | | | 382/224 |
| 2014/0351264 A1* | 11/2014 | Murray | ............. | G06F 17/30247 |
| | | | | 707/748 |
| 2014/0365463 A1* | 12/2014 | Tusk | ................. | G06F 17/30247 |
| | | | | 707/711 |
| 2015/0026101 A1* | 1/2015 | Lin | .................... | G06F 17/30247 |
| | | | | 706/12 |
| 2015/0120760 A1* | 4/2015 | Wang | ................. | G06K 9/6263 |
| | | | | 707/749 |
| 2015/0154232 A1* | 6/2015 | Ovsjanikov | ....... | G06F 17/30277 |
| | | | | 707/780 |
| 2015/0161175 A1* | 6/2015 | Yee | ................... | G06F 17/30395 |
| | | | | 707/772 |
| 2015/0178321 A1* | 6/2015 | Rivlin | ............... | G06F 17/30277 |
| | | | | 707/728 |
| 2015/0178786 A1* | 6/2015 | Claessens | .......... | G06Q 30/0269 |
| | | | | 705/14.66 |

FOREIGN PATENT DOCUMENTS

| | | |
|---|---|---|
| CN | 101896901 | 11/2010 |
| CN | 102150163 | 8/2011 |
| TW | 200929059 | 7/2009 |
| TW | I403912 | 8/2013 |

OTHER PUBLICATIONS

Cambria, Erik, et al., "Sentic Album: Content-, Concept-, and Context-Based Online Personal Photo Management System", Cognitive Computation, vol. 4, Issue 4, May 2012, pp. 477-496.*

Girgensohn, Andreas, et al., "Simplifying the Management of Large Photo Collections", Human-Computer Interaction (Interact 2003), vol. 3, Sep. 2003, pp. 196-203.*

"Flickr", Wikipedia, downloaded from: en.wikipedia.org/wiki/Flickr on Mar. 16, 2017, 10 pages.*

"Kodak Gallery", Wikipedia, downloaded from: en.wikipedia.org/wiki/Kodak_Gallery on Mar. 16, 2017, 3 pages.*

Wang, Gang, et al., "Learning Image Similarity from Flickr Groups Using Fast Kernel Machines", IEEE Transactions on Pattern Analysis and Machine Intelligence, vol. 34, No. 11, Nov. 2012, pp. 2177-2188.*

Platt, John C., "AutoAlbum: Clustering Digital Photographs", IEEE Workshop on Content-based Access of Image and Video Libraries, Hilton Head Island, SC, Jun. 12, 2000, IEEE Computer Society, pp. 96-100.*

Loui, Alexander C., et al., "A Software System for Automatic Albuming of Consumer Pictures", ACM Multimedia '99 (Part 2), Orlando, FL, Oct. 1999, pp. 159-162.*

Tsai, Shen-Fu, et al., "Content-Based Image Retrieval with Ontological Ranking", Proc. of SPIE—IS&T Electronic Imaging, SPIE vol. 7540, © 2010 SPIE—IS&T, 8 pages.*

Tao, Ju-Lan, et al., "A Bayesian Method for Content-Based Image Retrieval by Use of Relevance Feedback", Visual 2002, LNCS 2314, Springer-Verlag, Berlin, Germany, © 2002, pp. 76-87.*

Chang, Edward, et al., "PBIR: Perception-Based Image Retrieval—A System That Can Quickly Capture Subjective Image Query Concepts", MM '01, Sep. 30-Oct. 5, 2001, Ottawa, Canada, pp. 611-614.*

Tong, Simon, et al., "Support Vector Machine Active Learning for Image Retrieval", MM '01, Ottawa, Canada, Sep. 30-Oct. 5, 2001, pp. 107-118.*

Li, Beitao, et al., "Learning Image Query Concepts via Intelligent Sampling", Auto '93, Antonio, TX, Sep. 20-23, 1993, pp. 367-375.*

* cited by examiner

METHOD FOR SEARCHING RELEVANT IMAGES VIA ACTIVE LEARNING, ELECTRONIC DEVICE USING THE SAME

CROSS REFERENCE TO RELATED APPLICATION

This application claims the priority benefit of U.S.A. provisional application Ser. No. 61/921,539, filed on Dec. 30, 2013. The entirety of the above-mentioned patent application is hereby incorporated by reference herein and made a part of specification.

TECHNICAL FIELD

The present disclosure is related to a method of searching relevant images via active learning, a mobile electronic device using the same method.

BACKGROUND OF THE DISCLOSURE

Presently, users of a mobile electronic device would capture digital images (e.g., continuous or still images) with digital cameras, mobile phones, tablets, laptops, PDA's, and etc throughout their daily lives. Frequently, users may end up with hundreds or thousands of digital images stored in a memory storage device. For example, users may have taken thousands of images through their mobile devices having image capturing capabilities. Typically, images stored in a memory storage device of the mobile device could be left unsorted.

In order to search through all the images stored in the mobile device according to a user's needs, one may have to go through each of the images and sorting them such as by labeling them or placing them in various folders. These acts of sorting could be very inconvenient and unproductive. In some cases, a keyword based search engine could be utilized to identify a set of images relevant to a keyword queried by the user. However, one still has to go through each of the images relevant to the keyword and label the images individually. Therefore, there is a need to quickly and accurately identify relevant images among image databases and to group or sort the relevant images according to one's need (or one's query concept or search criteria) without going through an explicit and laborious labeling process.

SUMMARY OF THE DISCLOSURE

The present disclosure proposes a method of searching relevant images via active learning, a mobile electronic device using the same, and a computer readable medium for operating mobile electronic device.

According to one of the exemplary embodiments, a method of searching relevant images via active learning in a mobile electronic device is provided. The method would include at least, but not limited to, obtaining a query image comprising a first subject and a second subject, learning a query concept based on content information of the query image by sampling a plurality of first sample images from the stored images according to content information of the query image for relevance feedback, the first sample images comprising at least one image having the first subject, at least one image having the second subject, and at least one image having both the first and second subjects, and searching the relevant images among the stored images according to the query concept and grouping the relevant images into a collection album.

According to one of the exemplary embodiments, an electronic device that uses the aforementioned method is provided. The electronic device would include at least, but not limited to, a display unit, a storage device, and a processor coupled to the display unit and the storage unit. The storage device is for storing a plurality of stored images. The processor is configured for obtaining a query image that includes a first subject and a second subject, learning a query concept based on content information of the query image by sampling a plurality of first sample images from the stored images according to content information of the query image for relevance feedback, the first sample images comprising at least one image having the first subject, at least one image having the second subject, and at least one image having both the first and second subjects, and searching the relevant images among the stored images according to the query concept and grouping the relevant images into a collection album.

According to one of the exemplary embodiments, a user interface is provided to perform at least, but not limited to, steps of displaying at least one images to obtain at least one query image comprising a first subject and a second subject, obtaining at least one query image among the displayed image through relevance feedback, displaying a plurality of first sample images according to content information of the at least one query image for relevance feedback, obtaining at least one first selected image among the first sample images to learn a query concept based on content information of the at least one first selected image; and displaying a plurality of relevant images according to the query concept.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
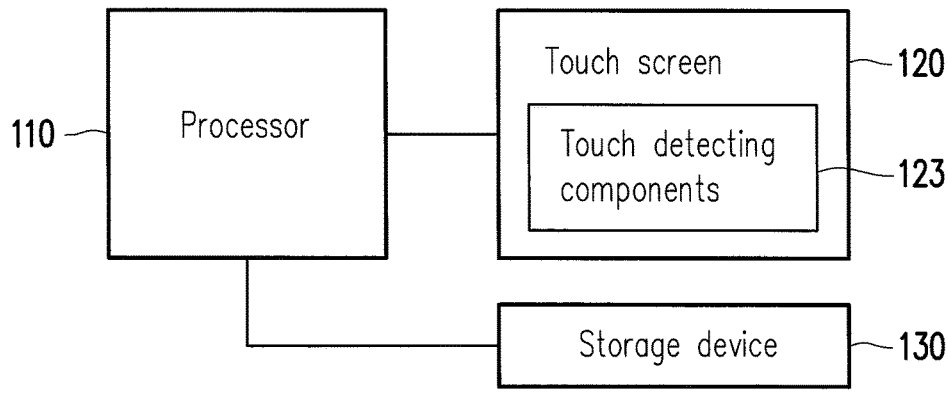
FIG. 1 is a block diagram illustrating hardware of a mobile electronic device in term of functional blocks according to one of the exemplary embodiments of the disclosure.

To make the above features and advantages of the application more comprehensible, several embodiments accompanied with drawings are described in detail as follows.

DETAILED DESCRIPTION OF DISCLOSED EMBODIMENTS

Reference will now be made in detail to the present embodiments of the disclosure, examples of which are illustrated in the accompanying drawings. Wherever possible, the same reference numbers are used in the drawings and the description to refer to the same or like parts.

In the disclosure, an apparatus for searching relevant images via active learning and a method thereof are provided. The disclosure would automatically label and group a plurality of images based on a query concept of a user. The query concept of the user is actively learned based on the content (e.g., person or object) and context (e.g., time, date, or location) information of a plurality of selected images by finding the most informative (unlabeled) images among a plurality of stored images for the user to solicit (i.e., an active learning algorithm). The active learning algorithm is an iterative process of relevance feedback that maximizes information collection and minimizes the iteration of the relevance feedback. In the disclosure, different information of the selected images would be utilized to maximize the information collection in iterations of the relevance feedback for learning the query concept. Detail description of the disclosure is described below with various embodiments of the disclosure. However, the embodiments are not intended to limit the disclosure.

FIG. 1 is a block diagram illustrating hardware of an electronic device 100 in term of functional blocks according to one of the exemplary embodiment of the disclosure.

With reference to FIG. 1, the mobile electronic device 100 may be a smart phone, a mobile phone, a tablet computer, a personal digital assistant (PDA), and so forth. In the exemplary embodiment, the electronic device 100 would include at least, but not limited to, a processor 110, a touch screen 120 and a storage device 130. The electronic device 100 may further include one or more wireless transceiver (not shown) for transmitting and receiving wireless data. The wireless transceiver could be, for example, a Wi-Fi card, a 3G hardware interface, a Bluetooth interface, a near-field communication (NFC) unit, and etc. The electronic device 100 may further include a digital image capturing device (not shown) for capturing digital images. The digital images could be a still image or a motion picture. Each components of the electronic device 100 would be explained in details below.

The processor 110 may be, but not limited to, a central processing unit (CPU), or a programmable microprocessor, a digital signal processor (DSP), a programmable controller, an application specific integrated circuit (ASIC), a programmable logic device (PLD) or other similar devices or a combination thereof utilized for general or specific application. In the present embodiment, the processor 110 may be electrically coupled to the touch screen 120 and the storage medium 130, respectively, where the processor 110 may control all of the operations of the exemplary electronic device 100.

The touch screen 120 may be a display device integrated with touch detecting components 123, which could simultaneously provide a display function and an input function within a display area 121 of the mobile electronic device 100. The display device may be, but not limited to, a liquid crystal display (LCD), a light-emitting diode (LED), a field emission display (FED), or other displays. The touch detecting components 123 are disposed in the display device and arranged in rows and columns, which are configured to detect a touch event. The touch event may include events generated by touching the touch screen 120 with a finger, a palm, body parts or other objects. The touch detecting components may be, but not limited to, a resistive, a capacitive an optical or other types of touch sensing devices which would be integrated as a part of the touch screen 120.

The storage device 130 may be volatile or nonvolatile memory storing buffered or permanent data such as media content such as images and application programs or instructions used to execute operations of the mobile electronic device 100. In one of the embodiments of the disclosure, the storage device 120 of the electronic device 100 would include a plurality of stored images. The stored images may be captured by an image capturing component (not shown) of the electronic device 100 or received from other devices through wire or wireless transmission. It should be noted that each of the stored images may include metadata, and the metadata of each of the stored images includes a facial feature, a perceptual feature, scene, shape, color, texture, time, date and location information, and so forth.

In the following, the metadata and its utilizations are described in detail. However, it is not intended to limit the disclosure.

In one of the embodiments of the disclosure, the storage device 130 may further include a people database, an image-to-person table, and a person-to-image table. In the embodiment, the people database may record an identified face (or an identified object) as a face representation of a person. The identified face may be represented by a facial feature extracted from the metadata of a given image. For example, the processor 110 would extract a facial feature from metadata of the given image and register the extracted facial feature to the people database as a facial representation. If the extracted facial feature is not associated with any entry in the people database, the processor 110 would create a new entry in the people database for the extracted facial feature. It should be noted that, in the embodiment, each entry represents one person having at least one face representation. Each entry may be identified by the name of corresponding person, an identification number, or an initial facial feature initially identified, the embodiment is not intended to limit the means of how each entry is recorded or identified in the people database. Next, if the extracted facial feature is associated with an entry already recorded in the people database, the processor 110 would register the extracted facial feature as one of the facial representations corresponding to the associated entry in the people database. It should be noted that the embodiment is illustrated with facial feature of one person's face in the image, however, it is not intended to limit the disclosure. In one of the embodiments of the disclosure, a plurality of faces within one image may be identified and recorded by respectively extracting facial features corresponding to each of the faces from the metadata of the image.

It should be noted that facial recognition may not have 100% accuracy, and person(s) in relevant images may be misidentified. For example, faces of the same person from different images could be identified as different persons, or faces of different persons could be identified as the same persons. Therefore, when mismatching occurs, a crowd-sourcing method may be utilized to identify ambiguous pairs to be the same or different people. Accordingly, the people table could be modified by merging or splitting the ambiguous pairs.

In the embodiment, the facial feature may be geometric information of eyes, nose, mouth, cheekbones, jaw, and so forth, such as shape, size, and relative position. Furthermore, three-dimensional facial features stored in the metadata may be utilized for identifying face(s). The three-dimensional facial features include, but not limited to, contour of the eye sockets, nose, chin, and so forth.

Moreover, the disclosure is not limited to facial recognition of people. It should be noted that the above embodiment may be utilized for recognizing or identifying an object within the images and register the identified object in an object database. In one of the embodiments of the disclosure, metadata may include the perceptual feature such as geometric information corresponding to animal, building, fruit, or any other objects. For example, the metadata may include geometric shape of a tiger.

In one of the embodiments of the disclosure, the processor 110 would analyze all of the images stored in the storage device to register the facial features representing each person in the people database (or object database). Afterward, the processor 110 may further build the image-to-person table and the person-to-image table according to the people database. In detail, the image-to-person table would records each identified person with respect to each of the stored images. For example, the image-to-person table includes a first column indicating an image and a second column indicating the person(s) identified in the image of the same row, where each row would record one of the stored images and the corresponding person(s) within that stored image. In other words, the image-to-person table records the identified person(s) within each of the image.

On the other hand, the person-to-image table would record the stored images with respect to the identified person(s). For example, the person-to-image table includes a first column indicating the identified person and a second column indicating the stored images corresponding to the identified person listed in the first column, where each row would record one identified person and the stored images having that identified person.

In one of the embodiments of the disclosure, scenes of the stored images may be identified according to the color, shape, and texture features stored in the metadata.

In the disclosure, context-related metadata of the stored images would also be utilized for refining the query concept of the user. The context-related metadata includes, but not limited to, time, date, and location information of the corresponding image.

Figure 2:
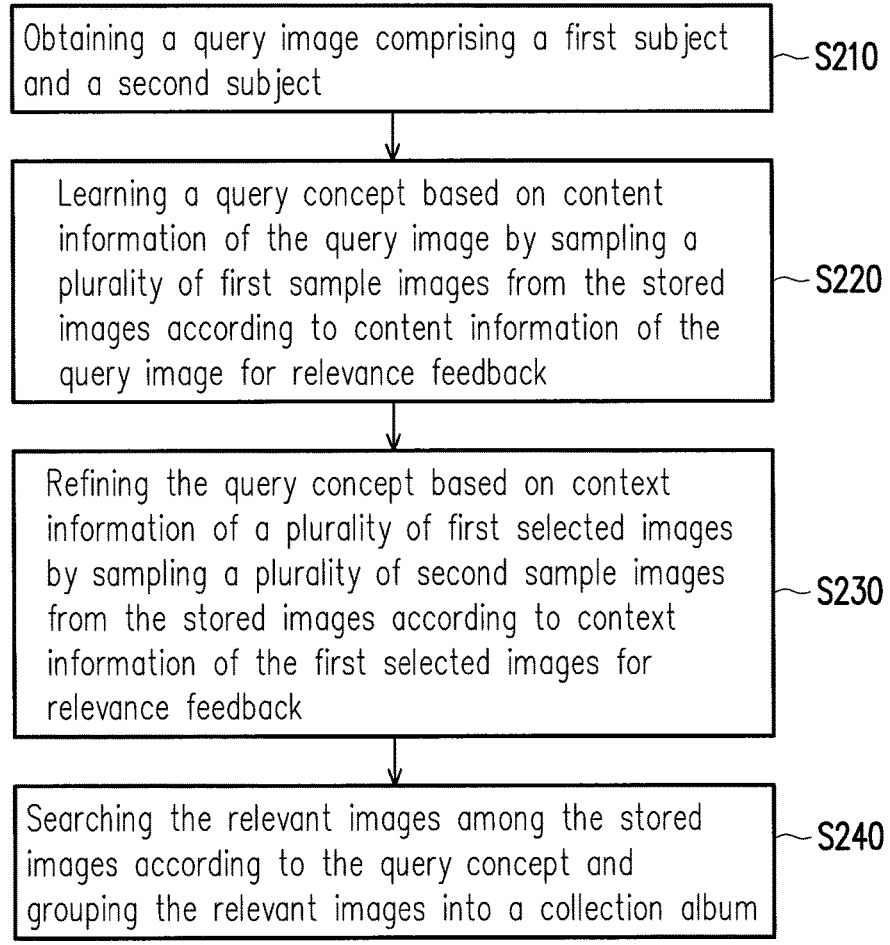
FIG. 2 is a flow diagram illustrating a method of searching relevant images via active learning according to one of the embodiments of the disclosure.

In the following, a method of searching relevant images via active learning is explained with accompany of the hardware illustrated in FIG. 1 according to one of the embodiments of the disclosure. FIG. 2 is a flow diagram illustrating a method of searching relevant images via active learning according to one of the embodiments of the disclosure. In the embodiment, the process of searching the relevant images via active learning may be initiated by obtaining at least one query image from an image database storing a plurality of stored images. With reference to FIG. 2, in step S210, a query image may be obtained, where the query image may have a first subject and a second subject. For example, the first subject and the second subject may be, but not limited to, person(s), scene, and object.

In step S220, the processor 110 may sample a plurality of sample images (as referred as first sample images) from the stored images according to the content information of the query image for relevance feedback to learn the query concept. The first sample images includes at least one image having the first subject but not the second subject, at least one image having the second subject but not the first subject, and at least one image having both the first and second subjects. The idea is to explore (or discover) all of possible subject(s) of the query concept through relevance feedback. The query concept may include the first subject only, the second subject only, the first and second subject,or an image having a group of subjects involving either the first or second subject. For example, when an image is given, one may ask what is/are the subject(s) at interest. Different questions (or possibilities of query concept) may be evaluated in order to clarify query concept of the user, such as "are there more subjects at interest", "does query concept contain all of the identifiable subjects (e.g., conjunctive) or only some of the identifiable subjects (e.g., disjunctive) in the given image", or "does query concept contain a group of people involving one or all of the identifiable subject". Therefore, in the exemplary embodiment, sampling strategy may be to sample images similar to the query image and at same time having other variations (e.g., different subject, person, scene, etc) to further explore the query concept. In one of the exemplary embodiments, the processor 110 would also sample images that do not have the first and second subjects of the query image to further explore whether other subjects are included in the query concept.

In detail, the processor 110 may extract content information from metadata of the query image. For example, the content information such as a facial feature of person(s) in the query image may be extracted, such as relative distances between eyes, nose, mouth, cheekbones, jaw, and so forth, so as to identify the person(s) within the query image. In one of the exemplary embodiments of the disclosure, low level content information such as shape, color or texture may be extracted for identifying subject of the query image. According to the content information extracted the query image, the processor 110 may sample the first sample images for relevance feedback. In the exemplary embodiment of the disclosure, the first sample images may be displayed on the display area 121 of the touch screen 120 to solicit user for selection. As a result, at least one selected image(s) (also referred as first selected image) may be obtained through the relevance feedback.

Accordingly, the processor 110 may learn the subject at interest through the relevance feedback. Based on the selected image, the processor 110 may learn the query concept according to content information of the first selected image among the first sample images through the relevance feedback.

Figure 3:
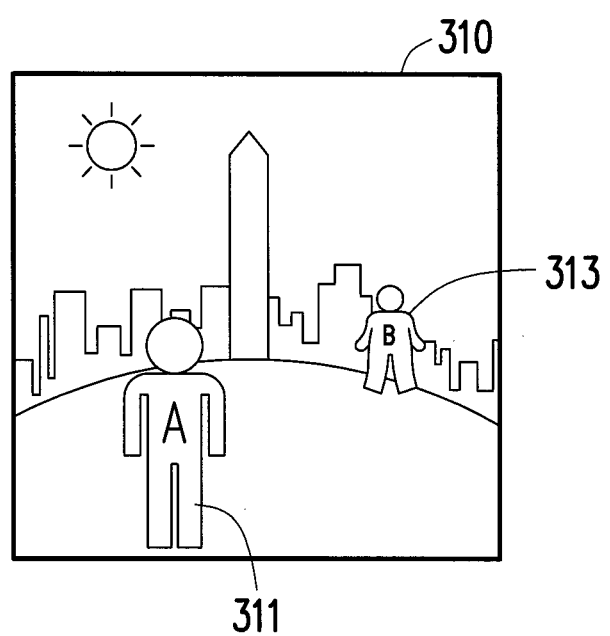
FIGS. 3 and 4 are conceptual diagrams illustrating a method of learning a query concept based on content information of a query image according to one of the exemplary embodiments of the disclosure.
Figure 4:
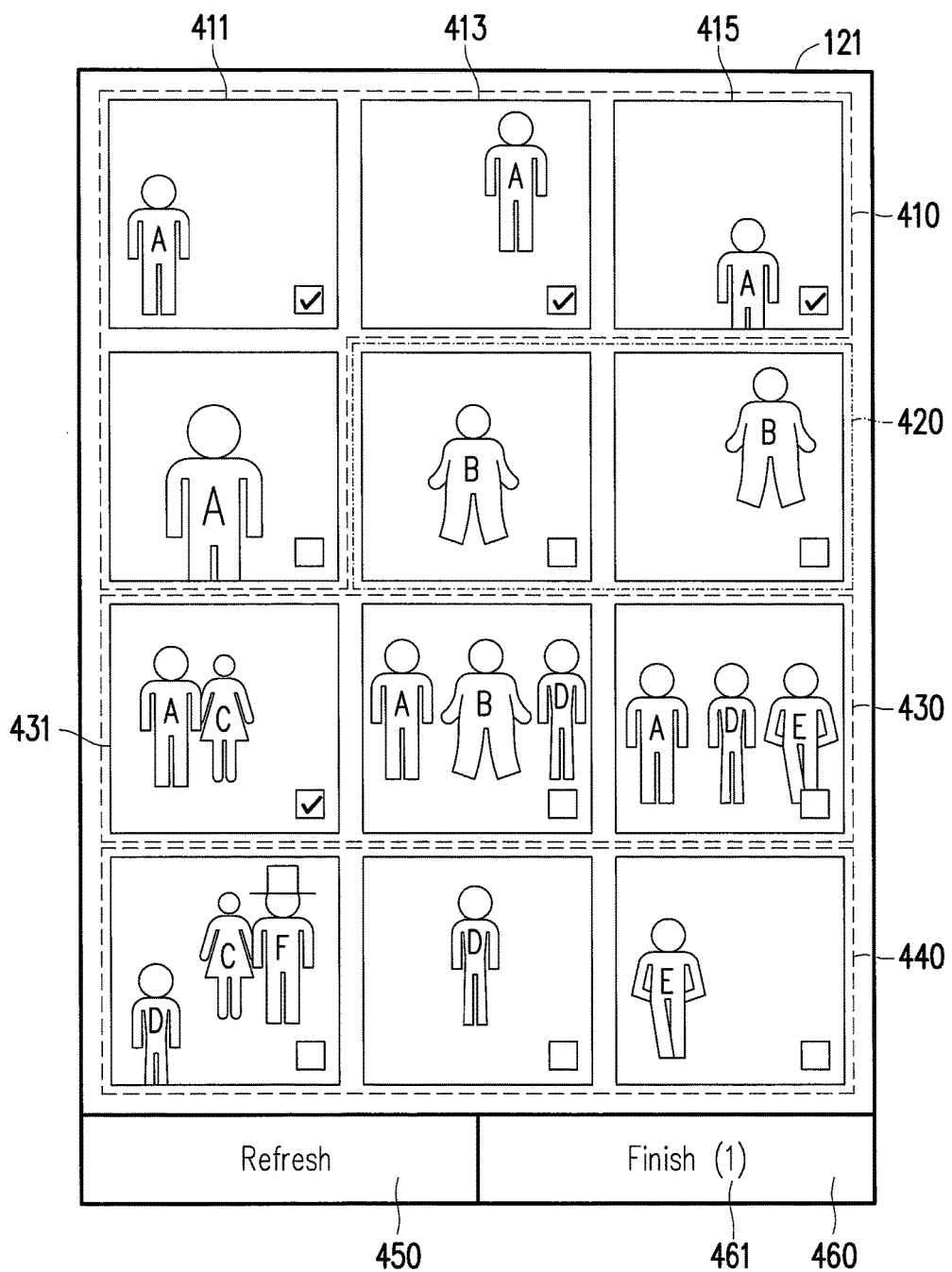

FIGS. 3 and 4 are conceptual diagrams illustrating a method of learning a query concept based on content information of a query image according to one of the exemplary embodiments of the disclosure. In the exemplary embodiment illustrated in FIG. 3, a query image 310 is illustrated. The processor 110 extracts the content information of the query image and identifies a first subject 311 (e.g., a person A) and a second subject 313 (e.g., a person B) in the query image. For example, two identified facial features may be extracted from the query image 310. For the ease of illustration, the first subject 311 (e.g., a person A) is included in part of the query concept of the user in the exemplary embodiment. According to the facial features of the first and second subjects identified in the query image, the processor 110 samples a plurality of first sample images from the stored images. It should be noted that the disclosure is not intended to limit that first or second subject 311, 313 to persons. In one of the exemplary embodiments of the disclosure, buildings or scenes may be identified based on the content information of the query image. The identified building or scenes may be one of the first subject 311 or the second subject 313.

With reference to FIG. 4, a screen shot of the electronic device 100 is illustrated. The first sample images are displayed on the display area 121 of the electronic device 100 to solicit user for feedback (relevance feedback). It should be noted that the first sample images are sampled based on the sampling strategy described above. In detail, the first sample images presented on the display area 121 for relevance feedback would include a first set of the first sample images 410, a second set of the first sample images 420, a third set of the first sample images 430, and a fourth set of the first sample images 440. The first set of the first sample images 410 includes images each having the first subject 311 (e.g., the person A) of the query image but not the second subject. The second set of the first sample images 420 includes images each having the second subject (e.g., the person B) of the query image but not the first subject. The third set of the first sample images 430 includes images having the first subject or the second subject of the query image in a group of people. For example, starting from the left hand side of the display area 121, a first image of the third set of the first sample images 430 includes the person A and a person C, a second image of the third set of the first sample images 430 includes the person A, the person B and a person D, and a third image of the third set of the first sample images 430 includes the person A, a person D, and a person E. In addition, the fourth set of the first sample images 440 includes images that do not contain either the first or second subjects of the query image to explore whether other subjects are in the query concept. For example, starting from the left-hand side of the display area 121, a first image of the fourth set of the first sample images 440 includes the person C, the person D, and a person F, a second image of the fourth set of the first sample images 440 includes the person D, and a third image of the fourth set of the first sample images 440 includes the person E.

In the exemplary embodiment, four images having the first subject 311 are sampled from the stored images for the first set of the first sample images 410. Two images having the second subject 313 are sampled from the stored images for the second set of the first sample images 420. Three images having both the first and second subjects 311, 313 are sampled from the stored images for the third set of the first sample images 430. In addition, three images having either the first or second subject 311, 313 are sampled from the stored images for the fourth set of the first sample images 440. In the exemplary embodiment, the processor 110 would analyze the query image to determine the likelihood of either the first subject or the second subject is in the query concept according to the extracted content information. For example, an area occupied by each of the first and second subjects within the query image may be determined. The area occupied by the first subject and the second subject may be determined through the facial features extracted from the metadata. Referring back to FIG. 3, a face of the first subject 311 may occupy a higher percentage of the query image 310 displaying area as compared to an area occupied by a face of the second subject 313. For example, the face of the first subject 311 may occupy 20% of the query image displaying area, and the face of the second subject 313 may occupy 10% of the query image displaying area. Accordingly, the processor 110 may determine that the first subject 311 has a higher likelihood to be in the query concept as compared to the second subject 313. Therefore, in the exemplary embodiment, more images are sampled from the stored image for the first subject 311 according the facial features of the query image 310. However, the disclosure is not intended to limit the number of images sampled for each set of the first sample images based on the percentage of occupied areas. The number of images sampled for each set of the first sample images may be configurable according to any design requirement. In one of the exemplary embodiments, more query images may be obtained. In such case, the number of images sampled for each set of the first sample images may be determined based on the number of appearance of each subject within the obtained query images.

Referring back to FIG. 4, if image(s) within the first set of the first sample images 410 is selected, the likelihood for the first subject to be included in the query concept would increase. If image(s) within the second set of the first sample images 420 is selected, the likelihood for the second subject to be included in the query concept would increase. If image(s) within the third set of the first sample images 430 is selected, the likelihood for an image including a group of subjects involving the first subject or the second subject would increase. If image(s) within the fourth set of the first sample images 440 is selected, the likelihood for subjects other than the first or second subject to be included in the query concept would increase.

It should be noted that various combinations between the first, second, third, and fourth set of the first sample images 410, 420, 430, 440 may occur, and the processor 110 would learn the query concept according to content information of the selected image(s). For example, a first image 411 within the first set of the first sample images 410 may be selected. The query concept may be inferred as the first subject only (e.g., sole shot of the first subject). In the exemplary embodiment, images from the first and third set of the first sample images may be selected. Under such case, the query concept may be inferred as the first subject within a group shot image. The query concept learned based on other combinations of the selected images may be inferred from the example illustrated above, the disclosure is not intended to limit the scope of the disclosure.

In one of the exemplary embodiments, the selected image(s) would be labeled as a positive instance, and each of the non-selected images would be labeled as a negative instance. In detail, the positive instance would indicate that the image is included in the learned query concept, and the negative instance would indicate that the image is not included in the learned query concept.

Furthermore, the learning of the query concept is an iterative process that iteratively samples another set of first sample images from the stored images according to content information of the first selected images obtained from the set of the first sample images of previous iteration, so as to learn the query concept. Moreover, the first selected images are accumulated from each of the iterations of the learning of the query concept. For example, the first selected images obtained for learning the query concept would refer to a total of at least one first selected images obtained from a first iteration, at least one first selected images obtained from a second iteration, and so forth. In other words, the first selected images would include to all of the images selected in the iteration of learning the query concept based on the content information.

In one of the exemplary embodiments of the disclosure, the set of the first sample images of each of the iterations may be sampled from the stored images that are unlabeled. In other words, the set of the first sample images are images that are not labeled as positive or negative instance. However, the disclosure is not limited thereto. The selected images may be presented again in the following iteration.

In the exemplary embodiment, the iteration of learning query concept based on the content information may continue until the number of the first selected images exceeds a first predetermined threshold. The first predetermined threshold may be configured according to design requirement, and the disclosure is not intended to limit the range of the first predetermined threshold.

The above embodiments are explained by illustrating the first and second subjects as people, however, the disclosure is not limited thereto. In one of the embodiment, the first subject or the second subject may be a scene, such as a city scene, a suburb scene, a country scene, a ocean scene, a scenery view having mountain or lake, and so forth. The scene of the query image or the first selected images may be determined through the content information such as shape, color, or texture. Therefore, it should be noted that the query concept may also be learned as a scene based on the content information.

After the number of the first selected images exceeds the first predetermined threshold, the processor 110 would further refine the query concept based on context information of the first selected images. Referring back to FIG. 2, in step S230, the processor 110 may further refine the query concept based on context information by sampling a plurality of second sample images from the stored images based on the context information of the first selected images for relevance feedback.

In detail, the processor 110 would extract the context information of the first selected images from the metadata, such as temporal information, location information, and so forth. The temporal information includes time, date, and year information. According to the context information, the processor 110 would sample the second sample images from the stored images. The second sample images may be sampled from a pool of unlabeled stored images to maximize the information collection through the relevance feedback. In other words, the second sample images would include those stored images that have not been labeled as positive or negative instance. However, the disclosure is not intended to limit thereto. In one of the exemplary embodiments, the labeled stored images may be sampled based on the context information.

In one of the exemplary embodiments of the disclosure, the query concept obtained based on the content information is further refined based on the temporal information extracted from metadata. In detail, the processor 110 would extract temporal (i.e., context) information such as time, date, and year information from the metadata of each of the first selected images and query image. Then, the processor 110 would sample the second sample images from the stored images based on the extracted time, date, and year information. The processor 110 may analyze the temporal information of first selected images and the query image to determine whether there is a similarity or a pattern in time, date, or year information between the first selected images and query image. For example, the processor 110 may discover that timestamps of the selected images (e.g., the first selected images and the query image) are within a time period (e.g., hours) of a particular date in a year. That is, the likelihood of the time period of that particular date in that year being in the query concept weighs higher than other time period, other dates, or other years. Accordingly, the processor 110 may sample the second sample images from the stored images for relevance feedback based on the discovered time period of that particular date of that year. In the exemplary embodiment, images having timestamps indicating other time periods or images having timestamps indicating the discovered time period on different dates or years are also sampled for relevance feedback to explore the query concept.

Referring back to FIG. 4, a first image 411, a second image 413, and a third image 415 of the first set of the first sample images 410 and a fourth image 431 of the third set of the first sample images 430 are selected as the first selected images through the relevance feedback. In the exemplary embodiment, the first selected images 411, 413, 415, and 431 are further analyzed based on the context information. Temporal information of the first selected images 411, 413, 415, 431 and the query image 310 are extracted from metadata of each of the first selected images to determine whether there is a similarity or a pattern in time, date, or year. For example, the first image 411 may have a timestamp indicating that the first image 411 is captured on Dec. 30, 2013 at 9:00 am. The second image 413 may have a timestamp indicating that the second image 413 is captured on Dec. 30, 2013 at 5:00 pm. The third image 415 may have a timestamp indicating that the third image 415 is captured on Jan. 1, 2014 at 10:00 am. In addition, the fourth images 431 may have a timestamp indicating that the fourth image 431 is captured on Dec. 30, 2013 at 9:10 am. In this example, a time period between Dec. 30, 2013 and Jan. 1, 2014 may be identified based on the first selected images, and images having timestamp between the identified time period may be sampled from the stored images to refine the query concept based on the temporal information.

Figure 5:
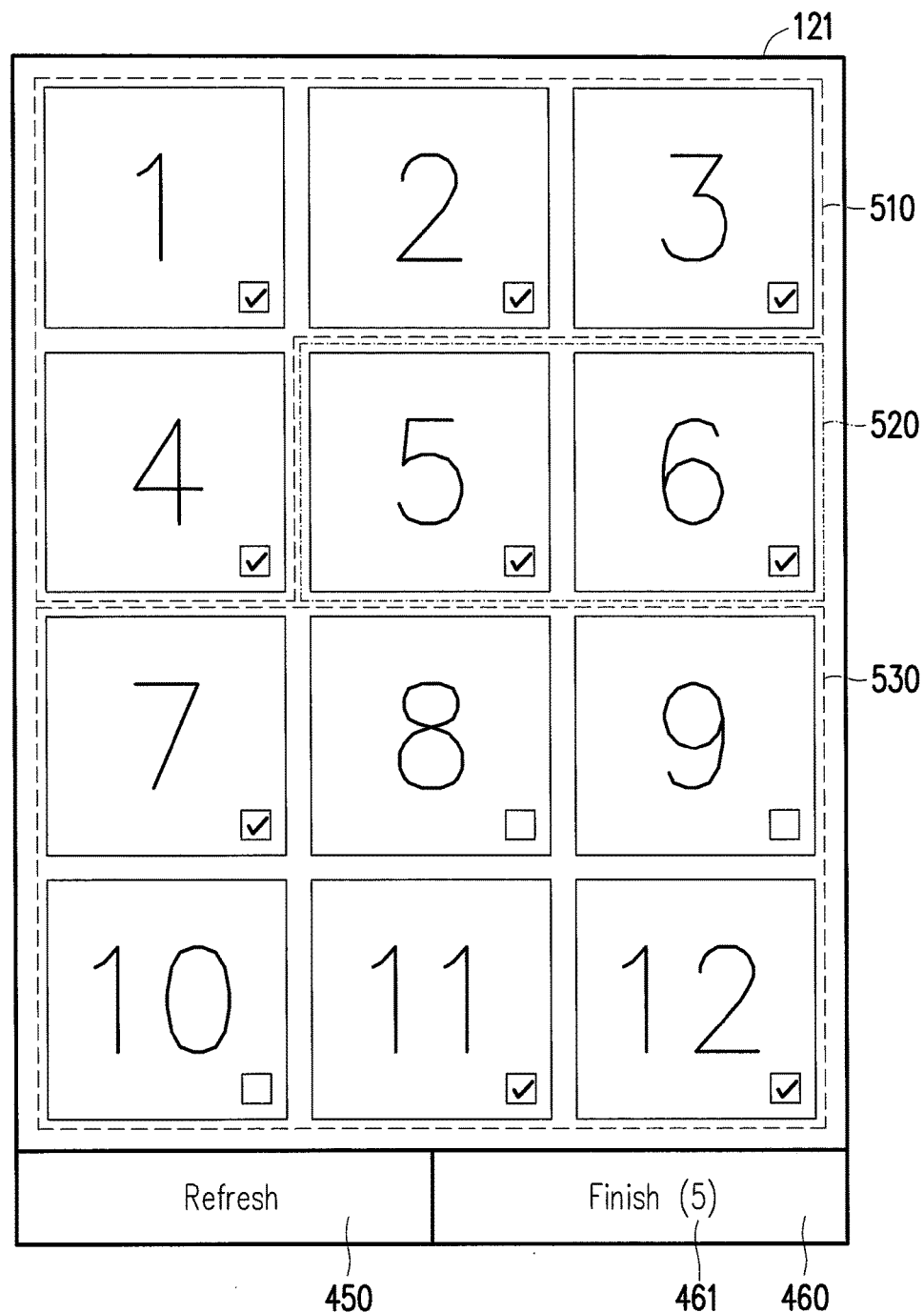
FIG. 5 is a conceptual diagram illustrating a plurality of second images sampled from the stored images based on temporal information of the first sample images and query image according to one of the exemplary embodiments of the disclosure.

FIG. 5 is a conceptual diagram illustrating a plurality of second images sampled from the stored images based on temporal information of the first sample images and query image according to one of the exemplary embodiments of the disclosure. It should be noted that each of the second sample images of FIG. 5 are illustrated by reference numbers for the ease of illustration, however, it is not intended to limit the disclosure. Each of the second sample images may be viewed as image having background, subject, and so forth.

With reference to FIG. 5, a plurality of second sample images 1-12 is displayed on the display area 121 of the electronic device 100. The second sample images 1-12 would include a first set of the second sample images 510, a second set of the second sample images 520, and a third set of the second sample images 530. In the exemplary embodiment, the first set of the second sample images 510 may include four images 1-4 having timestamp having a capturing time similar to the first selected images. For example, the image 1 may have a timestamp of Dec. 30, 2013, 11:00 am. The image 2 may have a timestamp of Dec. 30, 2013, 10:30 am. The image 3 may have a timestamp of Dec. 30, 2014, 8:00 pm. In addition, the image 4 may have a timestamp of Jan. 1, 2014, 3:00 pm.

It should be noted that the third set of the second sample images 530 may include the images 7-12 captured one or several days before or after the identified time period to determine whether the query concept is a chronicle event which corresponds to a specific date or repeated date every year. Furthermore, image captured from other years but within the identified time period of identified date may also be sampled from the stored image, so as to determine whether the query concept includes a yearly event occurred on the same date of different years. For example, the image 10 having the timestamp of Jan. 1, 2012 may be sampled for relevance feedback to explore whether the query concept is a yearly event. However, the exemplary embodiment is not intended to limit the disclosure. In one of the embodiment of the disclosure, images captured in different months but the same date may be sampled, so as to determine whether the query concept is a monthly event occurred on the same date of different months.

The third set of the second sample images 530 may include six images 7-12 having a capturing time outside of the identified time period between Dec. 30, 2013 and Jan. 1, 2014, so as to further explore the context of the query concept. For example, the image 7 may have a timestamp of Jan. 4, 2014, 12:00 pm. The image 8 may have a timestamp of Jan. 7, 2014, 3:00 pm. The image 9 may have a timestamp of Dec. 25, 2013, 8:00 am. The image 10 may have a timestamp of Jan. 1, 2012, 7:00 pm. The image 11 may have a timestamp of Dec. 28, 2013, 1:00 pm. In addition, the image 12 may have a timestamp of Dec. 29, 2013, 3:00 pm.

It should be noted that the date and time of the second sample images illustrated above are for the purpose of illustration, the disclosure is not limited thereto. The sampling strategy of the second sample images based on the temporal information of the context information may be designed according to design requirement.

It should be noted that the third set of the second sample images 530 may include the images 7-12 captured one or several days before or after the identified time period to determine whether the query concept is a chronicle event. Furthermore, image captured from other years but within the identified time period of identified date may also be sampled from the stored image, so as to determine whether the query concept includes a recursive yearly event occurred on the same date of different years. For example, the image 10 having the timestamp of Jan. 1, 2012 may be sampled for relevance feedback to explore whether the query concept is a yearly event. However, the exemplary embodiment is not intended to limit the disclosure. In one of embodiments of the disclosure, images captured in different months but the same date may be sampled, so as to determine whether the query concept is a monthly event occurred on the same date of different months.

In the exemplary embodiment, more images are sampled for the morning hours of Dec. 30, 2013 (i.e., the images 1 and 2), because the first image 411 and fourth image 431 among the first selected images are captured in the morning of Dec. 30, 2013, which indicates that the morning hours (i.e. am) of Dec. 30, 2013 weighs higher as compared to other time periods. In other words, the likelihood of the morning hours of the Dec. 30, 2013 being in the query concept is higher with respect to other time periods.

In the exemplary embodiment, the images 1-6 within the first and second sets of the second sample images 510, 520 are selected. In addition, the image 7, the image 11, and the image 12 of the third set of the second sample images 530 are also selected. The selected images are identified as second selected images. Accordingly, the query concept may be refined based on the temporal information of the second selected images. For example, based on the second selected images (e.g., the images 1-7, 11, 12) of the exemplary embodiment, the time period included in the query concept would be inferred to be a time period between Dec. 28, 2013 and Jan. 4, 2014. Due to the timestamp of the second selected images 7, 11, the time period identified based on the first selected images may be extended to the timestamps indicated by the selected images 7, 11 of the second selected images. In detail, the identified time period between Dec. 30, 2013 and Jan. 1, 2014 may be expanded to Dec. 28, 2013 (extracted from the selected image 11) as a lower boundary and Jan. 4, 2014 (extracted from the selected image 7) as an upper boundary.

It should be noted that the image 10 having the timestamp of Jan. 1, 2012, 7:00 pm is not selected as the second selected image. Therefore, the likelihood of the query concept being a yearly event would decrease since the image 10 captured in 2012 is not selected.

In one of the exemplary embodiments of the disclosure, the image 8 having a capturing time of Jan. 7, 2014 and the image 9 having a capturing time of Dec. 25, 2013 are not selected, and it may be inferred that the query concept does not include any dates on or beyond Jan. 7, 2014 and Dec. 25, 2013.

In one of the exemplary embodiments of the disclosure, the refining of the query concept based on the temporal information may be an iterative process that iteratively samples different sets of second sample images from the stored images according to context information of the second selected images obtained from the set of the second sample images obtained from the previous iteration, so as to refine the query concept based on the temporal information. For example, after the second selected images (e.g., the images 1-7, 11, 12) are selected, the refresh option 450 may be selected to sample another set of second sample images for further refining the query concept. In one of the embodiment, the another set of second sample images may be sampled from the stored images that are unlabeled based on the temporal information of the query image 310, the first selected images 411, 413, 415, 431, and the second selected images (e.g., the images 1-7, 11, 12).

It should be noted that, the set of the second sample images of each of the iterations are sampled from the stored images. In other words, the set of the second sample images may be images that are not labeled as positive or negative instance. Moreover, the second selected images are accumulated from each of the iterations of refining of the query concept. For example, the second selected images obtained for refining the query concept would refer to a total of the second selected images obtained from a first iteration, the second selected images obtained a second iteration, and so forth. In other words, the second selected images would include all of the second selected images selected in the iterations of refining the query concept based on the context information.

In the exemplary embodiment, the iteration of refining the query concept based on the context information may continue until the number of the second selected images exceeds a second predetermined threshold or a finish request. The second predetermined threshold may be configured according to design requirement, and the disclosure is not intended to limit the range of the second predetermined threshold. Furthermore, the finish request may be made to indicate a completion of the refining of the query concept based on the context information. For example, a finish option 460 may be selected to indicate a completion of the refining of the query concept. In the exemplary embodiment, the finish option 460 may also include a field 461 displaying a total number of the selected images already selected through the relevance feedback.

As discussed above, the context information of the images also includes the location information. In one of the exemplary embodiments of the disclosure, the query concept may be refined based on the location information indicating a location where images were captured. For example, with reference to FIG. 4, the first selected images 411, 413, 415, 431 and the query image 310 include images captured in Washington D.C. and New York City. Based on the location information of the first selected images 411, 413, 415, 431 and the query image 310, a plurality of second sample images 21-30 may be sampled from the stored images for relevance feedback.

Figure 6:
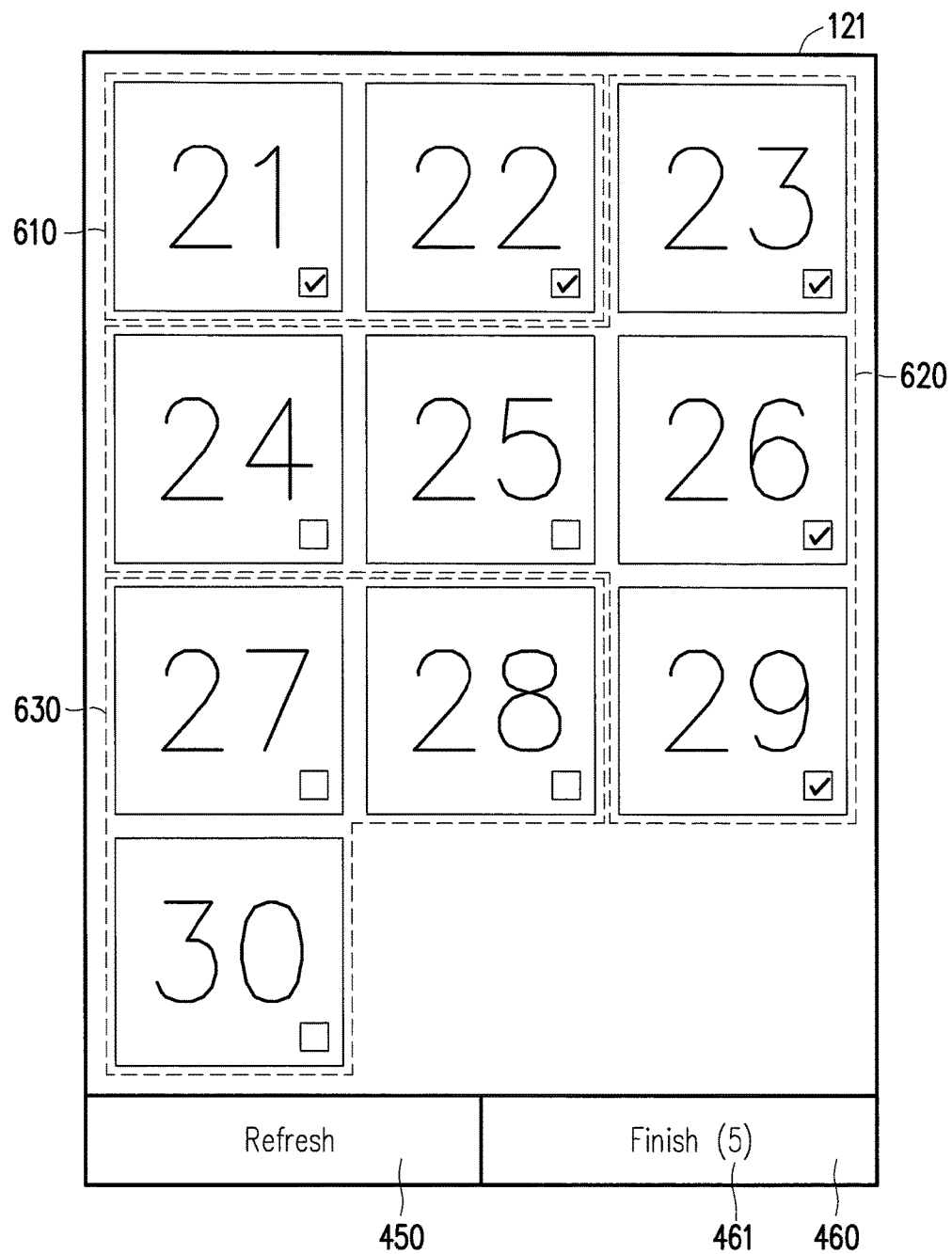
FIG. 6 is a conceptual diagram illustrating a plurality of second sample images sampled from the stored images based on the location information of first selected images and the query image according to one of the exemplary embodiments of the disclosure.

FIG. 6 is a conceptual diagram illustrating a plurality of second sample images 21-30 sampled from the stored images based on the location information of the first selected images 411, 413, 415, 431 and the query image 310 according to one of the exemplary embodiments of the disclosure. For example, a first image of the second sample image 21 may have location information associated to New York City, USA. A second image of the second sample image 22 may have location information associated to Washington D.C., USA. A third image of the second sample image 23 may have location information associated to Philadelphia, USA. A fourth image of the second sample image 24 may have location information associated to Chicago, USA. A fifth image of the second sample image 25 may have location information associated to Toronto, Canada. A sixth image of the second sample image 26 may have location information associated to Boston, USA. A seventh image of the second sample image 27 may have location information associated to Tokyo, Japan. An eighth image of the second sample image 28 may have location information associated to Taipei, Taiwan. A ninth image of the second sample image 29 may have location information associated to Baltimore, USA. In addition, a tenth image of the second sample image 30 may have location information associated to London, UK. It should be noted that each of the second sample images 21-30 of FIG. 6 are illustrated by its reference number to indicate the differences between each of the second sample images 21-30 for the purpose of illustration. Each of the second sample images 21-30 may be different image having background, subject, and so forth.

With reference to FIG. 6, the second sample images 21-30 would include a first set of the second sample images 610, a second set of the second sample images 620, and a third set of the second sample images 630. For example, the first set of the second sample images 610 may include two images 21, 22 having location information associated with the first selected images 411, 413, 415, 431 and the query image 310. The second set of the second sample images 620 may include five images 23, 24, 25, 26, 29 having location information nearby the location of the first selected images 411, 413, 415, 431 and the query image 310. The third set of the second sample images 630 may include more images 27, 28, 30 having other location information, so as to further explore the context of the query concept. It should be noted that the locations of the second sample images 21-30 illustrated above are for the purpose of illustration, the disclosure is not limited thereto. The sampling strategy based on the location information of the context information may be designed according to design requirement.

In the exemplary embodiment, the first and second images 21, 22 within the first set of the second sample images 610 and the third image 26, the sixth image 26, and the ninth image 29 included in the second set of the second sample images 620 are selected as second selected images 21, 22, 23, 26, 29 through the relevance feedback. In detail, the first and second images 21, 22 included in the first set of the second sample images 610 are associated with Washington D.C. and New York City, USA. The third image 23 included in the second set of the second sample images 620 is associated with Philadelphia, USA. The sixth image 26 included in the second set of the second sample images 620 is associated with Boston, USA. The ninth image 29 included in the second set of the second sample images 630 is associated with Baltimore, USA. Based on the second selected images 21, 22, 23, 26, 29, the processor 110 may infer that the context information of the query concept may include Washington D.C., Baltimore, Philadelphia, New York City, and Boston in the United States. For example, the query concept may be inferred as a trip of the first subject 311 (e.g., the person A) to the northeast of the United States. In one of the exemplary embodiments of the disclosure, the processor 110 may sample more second sample images from the stored images according to the location information of the second selected images 21, 22, 23, 26, 29 to further refine the location information of the query concept.

In one of the exemplary embodiments of the disclosure, the refining of the query concept based on the location information may be an iterative process that iteratively samples different sets of second sample images from the stored images according to context information of the second selected images obtained from the set of the second sample images of previous iteration, so as to refine the query concept based on the context information. For example, after the second selected images (e.g., the images 21, 22, 23, 26, 29) are selected, a refresh option 450 may be selected to sample another set of second sample images for further refining the query concept. The another set of second sample images may be sampled from the stored images according to the location information extracted from the query image 310, the first selected images 411, 413, 415, 431, and the second selected images (e.g., the images 21, 22, 23, 26, 29).

It should be noted that the second selected images are accumulated from each of the iterations of the refining of the query concept. For example, the second selected images obtained for refining the query concept would refer to a total of the second selected image(s) obtained from a first iteration, a set of the second selected image(s) obtained a second iteration, and so forth. In other words, the second selected images would include to all of the images selected in the iterations of refining the query concept based on the context information.

In one of the exemplary embodiments, the set of the second sample images of each of the iterations are sampled from the stored images that are unlabeled. In other words, the set of the first sample images may be images that are not labeled as positive or negative instance.

In the exemplary embodiment, the iteration of refining the query concept based on the context information may continue until the number of the second selected images exceeds a second predetermined threshold or a finish request. The second predetermined threshold may be configured according to design requirement, and the disclosure is not intended to limit the range of the first predetermined threshold. Furthermore, the finish request may be made to indicate a completion of the refining of the query concept based on the context information. For example, a finish option 460 may be selected to indicate the completion of the refining of the query concept.

Although the query concept is respectively refined based on the temporal information and the location information in the above exemplary embodiments, the disclosure is not limited thereto. In one of the exemplary embodiments of the disclosure, the query concept may be refined based on the temporal information and the location information consecutively. For example, a plurality of second sampled image may be sampled based on the temporal information to obtain second selected image(s) through relevance feedback in a first iteration of refining the query concept. In addition to the temporal information, another set of the second sample images may be sampled by considering location information of the first selected image(s) and the second selected image(s) obtained in the first iteration of refining the query concept. It should be noted that the disclosure is not limited to refining the query concept based on the temporal information first. In one of the exemplary embodiments of the disclosure, the query concept may be refined based on the location information and then temporal information. In another exemplary embodiment, the query concept may be refined by interchanging the temporal information and the location information as the criteria for sampling the second sample images from the stored images.

For example, in the exemplary embodiment, the query concept may be first learned based on the content information of the query image and refined based on the context information of the query image and the first selected images (e.g., images selected for identifying the content of the query concept) through relevance feedbacks. Based on the exemplary embodiments illustrated in FIGS. 3-6, the query concept may be "a northeast of United States trip of the person A between Dec. 28, 2013 and Jan. 4, 2014", where the person A is learned based on the content information of the query image 311 and the first selected images 411, 413, 415, 431 and the query concept of northeast of United States trip between Dec. 28, 2013 and Jan. 4, 2014 may be learned based on the context information of the query image 311, the first selected images 411, 413, 415, 431, and the second selected images 1-7, 11, 12, 21, 22, 23, 26, 29.

Figure 7:
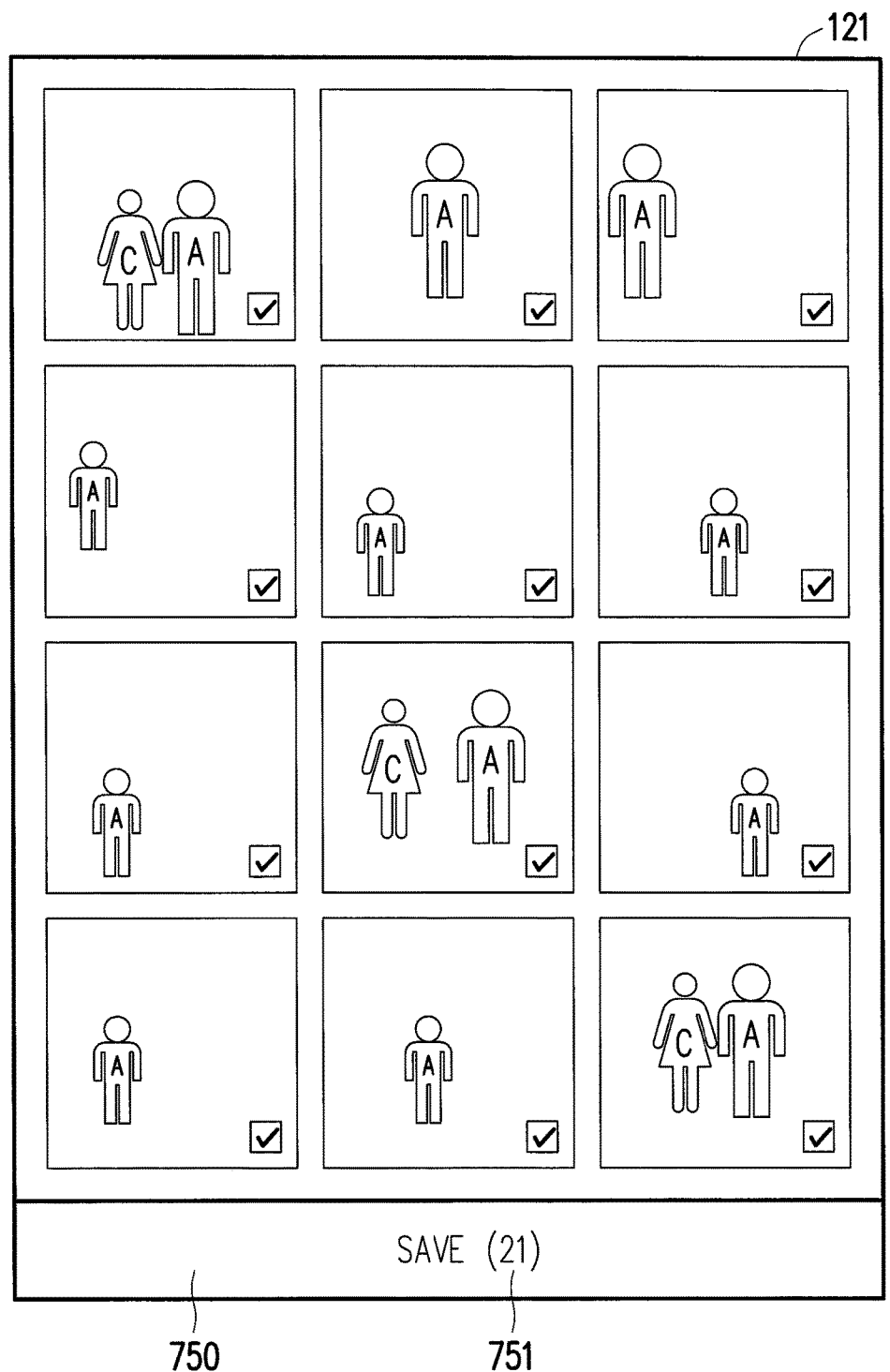
FIG. 7 is a conceptual diagram illustrating a display of the relevant images according to one of the exemplary embodiments of the disclosure.

After the completion of the refining the query concept, a plurality of relevant images among the stored images may be searched and grouped into a collection album. Referring back to FIG. 2, in step S240, the relevant images are searched among the stored images according to the refined query concept (including content and context), and then the relevant images may be grouped into a collection album. In the exemplary embodiment of the disclosure, the processor 110 may display all of the relevant images searched based on the query concept on the touch screen 120. FIG. 7 is a conceptual diagram illustrating a display of the relevant images according to one of the exemplary embodiments of the disclosure.

With reference to FIG. 7, the touch screen 120 would display the relevant images that may fit in the display area 121 of the touch screen 120, and other portions of the relevant images may be viewed by scrolling up/down or switching pages. The display area 121 may also include a field 751 within a save option 750 displaying a total number of the relevant images obtained through a relevance search based on the refined query concept. The save option 750 may be selected (e.g., pressing an area of touch screen displaying the save option 750) to save the relevant images in the collection album.

In one of the exemplary embodiments, mismatching of the relevant images may be discovered while viewing the relevant images. That is, subject(s) (e.g., person or scene) in the mismatched relevant image may be misidentified as relevant image. Therefore, when mismatching is discovered, the mismatched relevant image may be removed from the list. In one of the exemplary embodiments, the people database may be updated by removing the facial representation corresponding to the mismatched relevant from a list of the facial representation representing the identified person.

Figure 9:
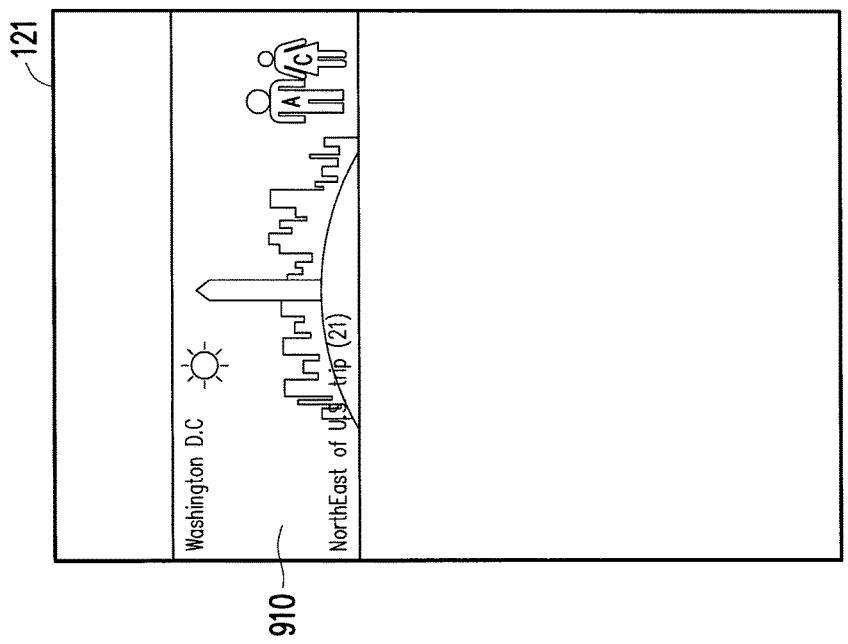
FIGS. 8 and 9 are conceptual diagrams illustrating grouping of the relevant images into the collection album according to one of the exemplary embodiments of the disclosure.
Figure 8:
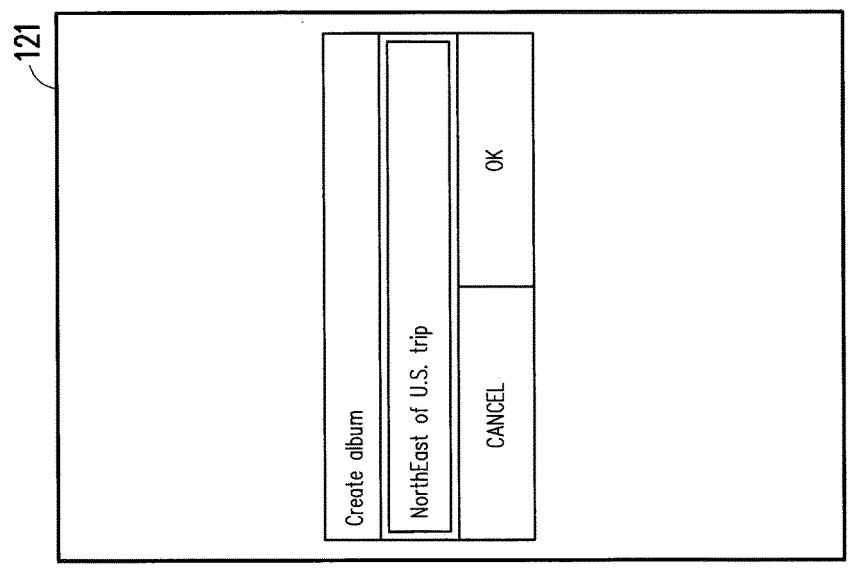

FIGS. 8 and 9 are conceptual diagrams illustrating grouping of the relevant images into the collection album according to one of the exemplary embodiments of the disclosure. With reference to FIG. 8, after the save option 750 is selected, user may be prompted to insert a title for the collection album. With reference to FIG. 9, a smart album is displayed listing the saved collection album. In the exemplary embodiment, the relevant images corresponding to the northeast of United States trip may be grouped together, which may be viewed again by selecting an icon 910 representing the northeast of United States trip illustrated in FIG. 9.

In one of the exemplary embodiments, an image newly obtained from the image capturing device (not shown) or other electronic devices (not shown) may be automatically identified as a new relevent image corresponding to the query concept. The the newly obtained image may be automatically grouped into an existing collection album associated to the query concept.

In the following, various exemplary embodiments of the disclosure are illustrated to further elaborate the apparatus for searching a plurality of relevant images via active learning and the method thereof.

Figure 10:
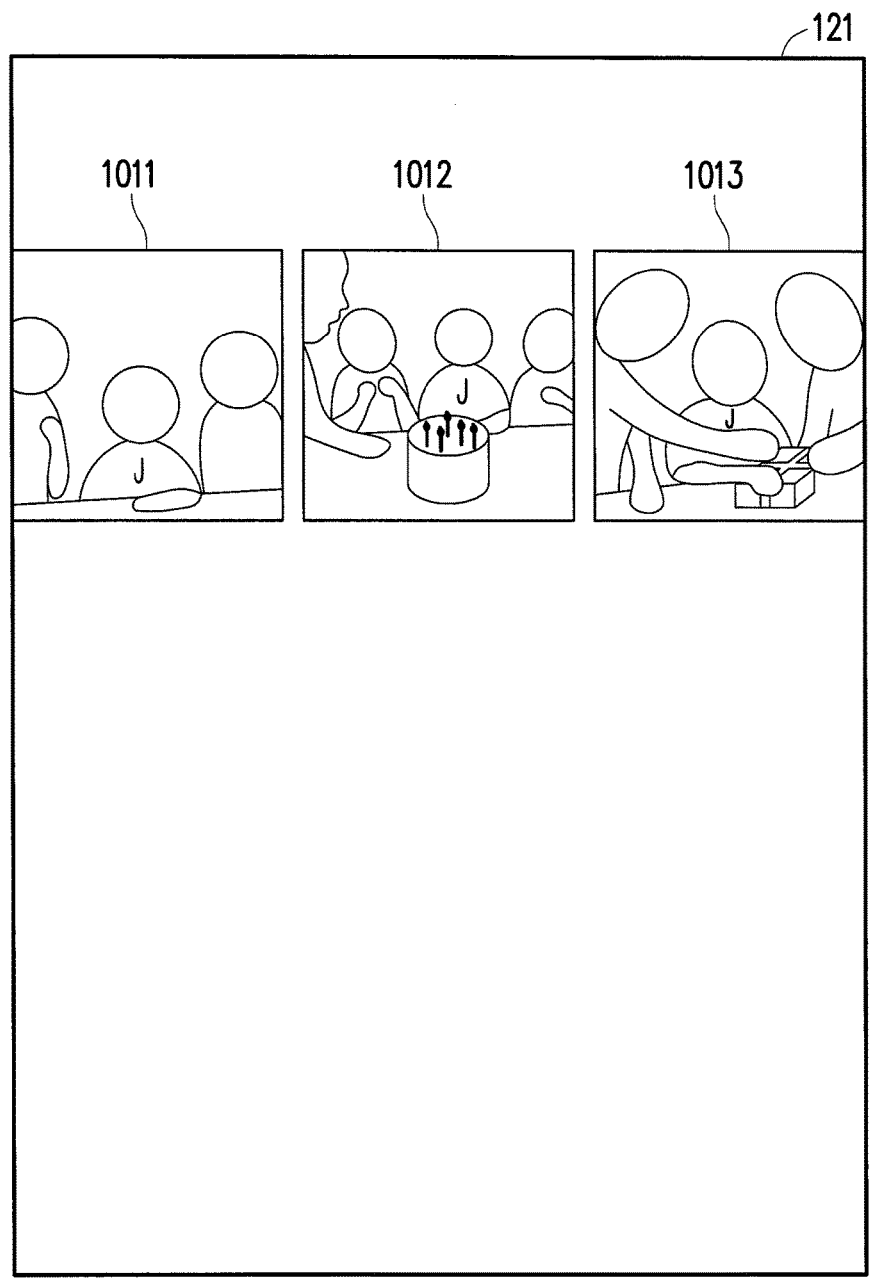
FIGS. 10-14 are conceptual diagrams illustrating searching and grouping a plurality of relevant images corresponding to a child J's birthday according to one of the exemplary embodiments of the disclosure.

The disclosure also includes a user interface that allowing a user to search and group a plurality of relevant images via active learning. FIGS. 10-14 are conceptual diagrams illustrating searching and grouping a plurality of relevant images corresponding to a child J's birthday according to one of the exemplary embodiments of the disclosure. The exemplary embodiment illustrated in FIG. 10 is presented in turn of user interface.

The touch screen 120 may display a plurality of initial images to solicit user for relevance feedback. With reference to FIG. 10, three images 1011, 1012, 1013 may be presented in the display area 121. Any or all of the three images 1011, 1012, 1013 may be selected by the user to initiate the search for relevant images via active learning. For example, a first image 1011, a second image 1012, and a third image 1013 displayed in the display area 121 of the electronic device 100 are selected as query image(s). In the exemplary embodiment, a child J (i.e., a first subject) is identified in the first image 1011 alone with two other people (e.g., a second subject and a third subject) according to the content information (e.g., facial features) extracted from the metadata of the first image 1011. The child J is also identified in the second image 1012 alone with three other people (e.g., the second and third subjects and a fourth subject) and the third image 1013 alone to two other people (e.g., the second and third subjects) according to the content information (e.g., facial features) extracted from the metadata of the second and third images 1012, 1013.

Figure 11:
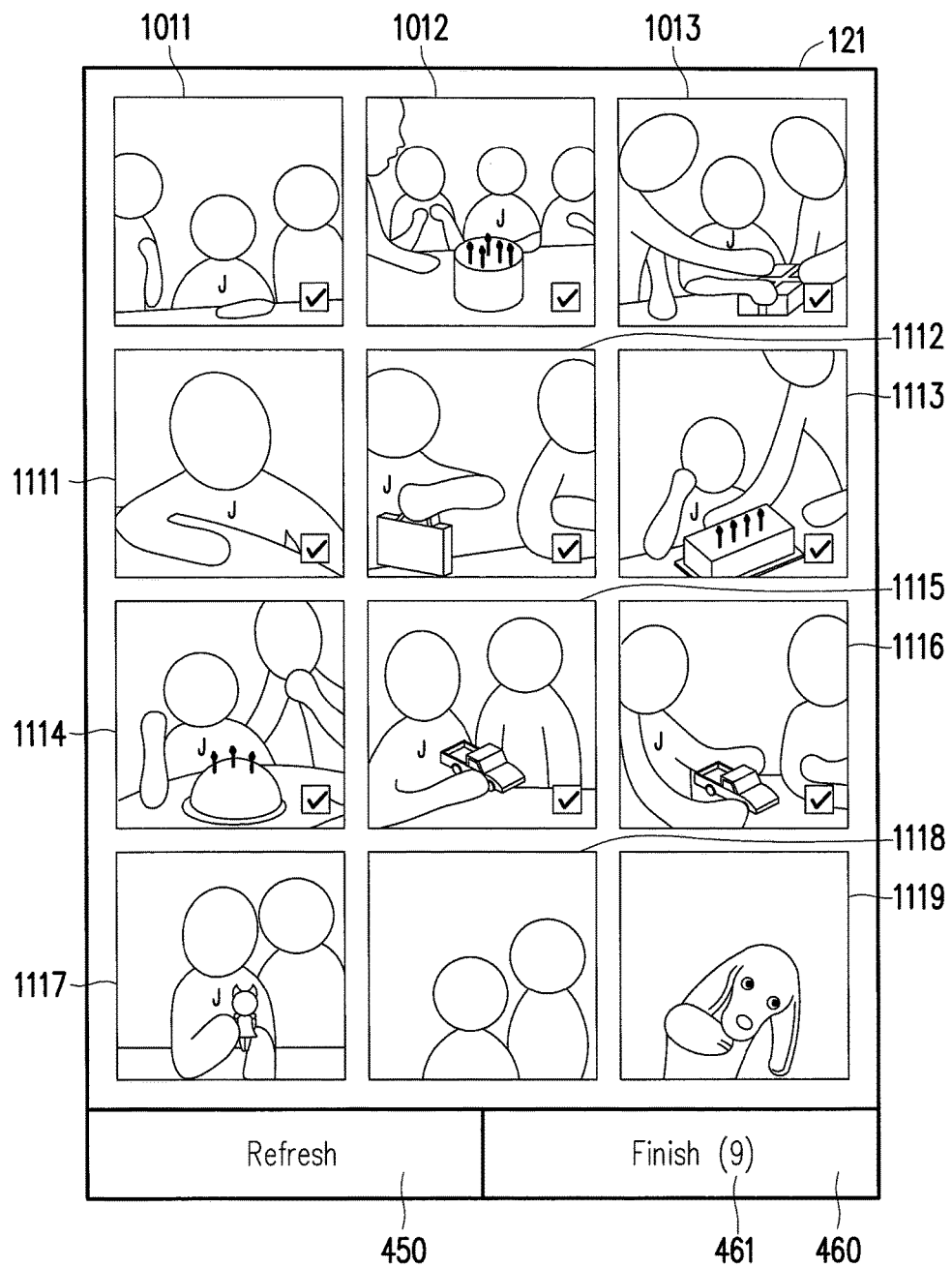

With reference to FIG. 11, a plurality of sample images 1011-1013, 1111-1119 (also referred to as first sample images) may be displayed to learn a query concept of the user. In the exemplary embodiment, the query concept may include content criteria and context criteria. The processor 110 may sample the first sample images (e.g., the images 1011-1013, 1111-1119) based on the content information of the query images (e.g., the facial features of the four identified persons) 1011, 1012, 1013.

In the exemplary embodiment, the processor 110 may consider that the child J has a higher likelihood to be in the content criteria of the query concept as compared to the second, third, and fourth subjects identified in the query images. Therefore, the first sample images (e.g., the images 1011-1013, 1111-1119) may include various images having the child J to explore the content criteria of the query concept. For example, sole shot and group shot having the child J are sampled to explore whether the user is interest in the child J, other identified subject or a group of people. However, the disclosure is not limited to the specific sampling strategy illustrated above.

Then, the processor 110 may display the first sample images (e.g., the images 1011-1013, and 1111-1119) in the display area 121 for relevance feedback, and at least one first selected image(s) (e.g., images 1011, 1012, 1013, 1111-1116) may be obtained from the first sample images through the relevance feedback.

After the at least one first selected image(s) (e.g., the images 1011, 1012, 1013, 1111-1116) is obtained through the relevance feedback, the processor 110 may analyze the content information extracted from the at least one first selected image (e.g., the images 1011, 1012, 1013, 1111-1116), and discover that the child J appears in every one of the first selected images which includes a sole shot of the child J (e.g., the image 1111), so the likelihood of the child J being the content criteria of the query concept is high. Therefore, the content criteria of the query concept are learned based on the content information corresponding to the child J. At this time, the user may select the refresh option 450 to display another set of the first sample images as to further define the content criteria of the query concept based on the first selected images. In detail, the processor 110 may iteratively display different sets of the first sample images based on the content information of the first selected images obtained from the previous iteration. On the other hands, the user may select a finish option 460 to indicate a completion of identifying the content criteria of the query concept.

After the user has indicated that the content criteria of the query concept are learned, the processor 110 may analyze context information of the first selected images (e.g., the images 1011, 1012, 1013, 1111-1116) to determine a similarity of the first selected images (e.g., the images 1011, 1012, 1013, 1111-1116) in time or location. In the exemplary embodiment, the processor 110 may learn that the first selected images (e.g., the images 1011, 1012, 1013, 1111-1116) are related to an event occurs on a same date but different year based on the temporal information of each of the first selected images extracted from the metadata. With reference to FIG. 11, based on the temporal information (e.g., time, date, and year), the first selected images (e.g., the images 1011, 1012, 1013, 1111-1116) are images captured on a birthday of child J in different year. For example, within the first selected images (e.g., the images 1011, 1012, 1013, 1111-1116) illustrated in FIG. 11, the images 1011-1013, 1111 are captured on the birthday of the child J in year 2014, the images 1112, 1113 are captured on the birthday of the child J in year 2013, the images 1115, 1116 are captured on the birthday of the child J in year 2012, and the image 1114 is captured on the birthday of the child J in year 2011. In the exemplary embodiment, the processor 110 may initially infer the context criteria of the concept to be child J's birthday occurred in different years.

Figure 12:
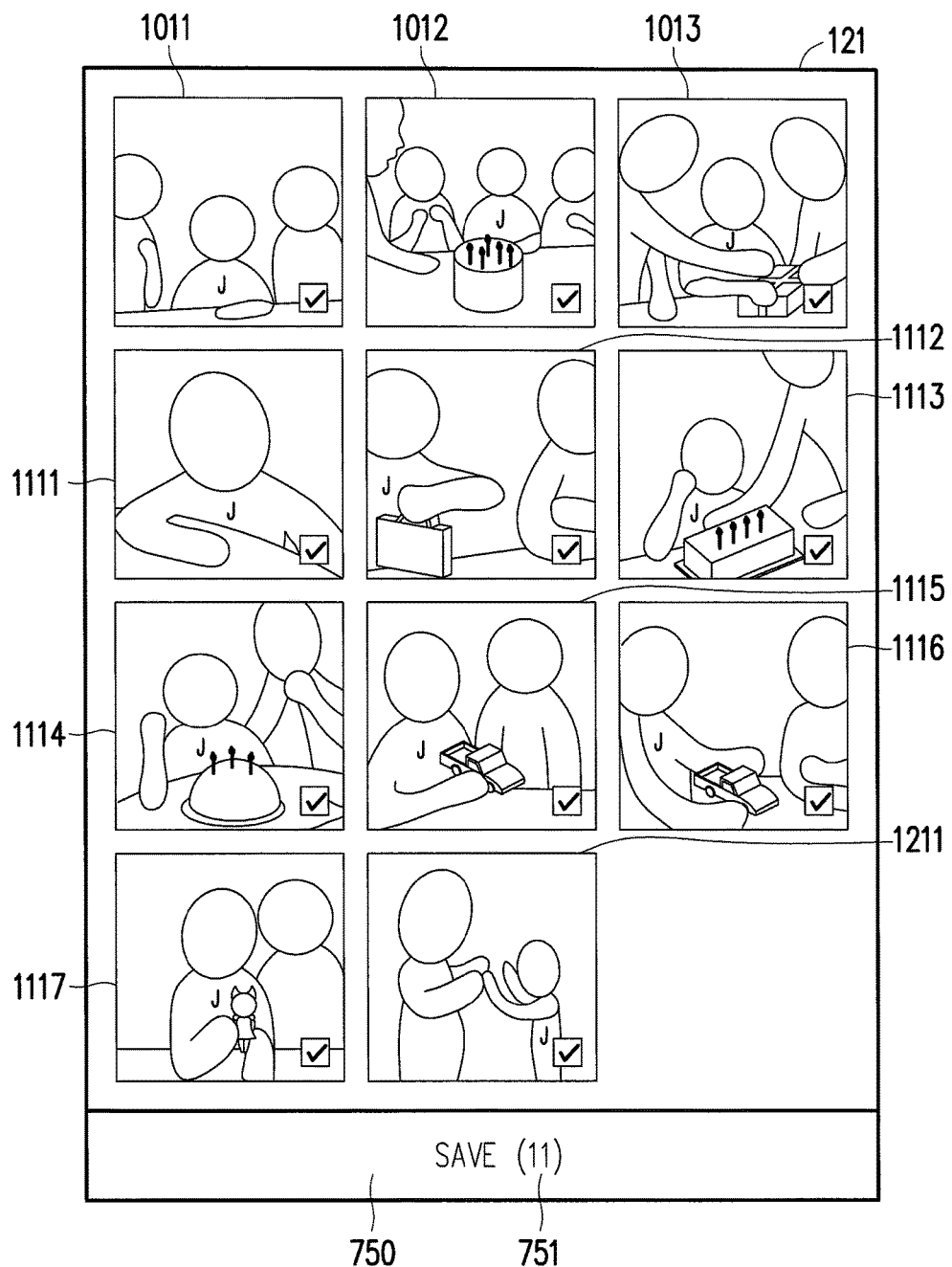

Next, the processor 110 may display a plurality of second sample images according to the context criteria of the query concept, which is initially learned based on the first selected images, to refine the context criteria of the query concept. With reference to FIG. 12, the second sample images are displayed for the relevance feedback. It should be noted that the processor 110 automatically samples image 1211 of the second sample images from the stored images, where the image 1211 is related to child J's birthday in a year other than years 2011-2014 indicated by the first selected images (e.g., the images 1011, 1012, 1013, 1111-1116). In the exemplary embodiment, all of the images illustrated in FIG. 12 are selected as relevant to the child J's birthday.

In the exemplary embodiment, the second sample images (e.g., the images 1011, 1012, 1013, 1111-1116, 1117, 1211) illustrated in FIG. 12 are selected as second selected images. Accordingly, the context criteria of the query concept are refined based on the second selected images (e.g., the images 1011, 1012, 1013, 1111-1116). For example, after the second selected images are obtained, the context criteria of the query concept may be refined to be child J's birthday in every year since the first and second selected images includes images captured on the birthday of the child J occurred in various years (e.g., years 2010 thru 2014).

In one of the exemplary embodiments of the disclosure, the processor 110 may further display a query message inquiring the user to refine the context criteria of the query concept. For example, the processor 110 may inquire the user to determine whether all images relating to the birthday of the child J or images relating to the birthday of the child J in year 2014 are queried. It should be noted that year 2014 is automatically displayed as the query message, because four of the first selected images illustrated in FIG. 11 has temporal information indicating year 2014, which indicates that year 2014 has a higher weigh as compared to the images captured in other years. In one of the exemplary embodiments, the query message may also include an option that would display all of the identified year to solicit user for selection. Afterward, the processor 110 may update the context criteria of the query based on user selection.

With reference to FIG. 12, a save option 750 may be selected to save the second selected images in a collection album. In the exemplary embodiments, all of the images that satisfy the content criteria and the context criteria of the query concept among the stored images are sampled and displayed in the display area 121. Therefore, the save option 750 is displayed for the user to indicate a completion of active learning of the query concept. However, the disclosure is not limited thereto. In other exemplary embodiments, the refresh option 450 may be displayed for further refining the context information of the query concept. For example, after the second selected images are selected, the refresh option 450 may be selected. When the refresh option 450 is selected, another set of the second sample images may be sampled from the stored image according to the context information of the second selected images (e.g., the images 1011, 1012, 1013, 1111-1116, 1117, 1211), so that the context criteria of the query concept may be further refined based on the time or location through the relevance feedback. In other exemplary embodiments, the query concept may be refined based on the content information of the second selected images (e.g., the images 1011, 1012, 1013, 1111-1116, 1117, 1211) to further explore the content criteria of the query concept.

Figure 14:
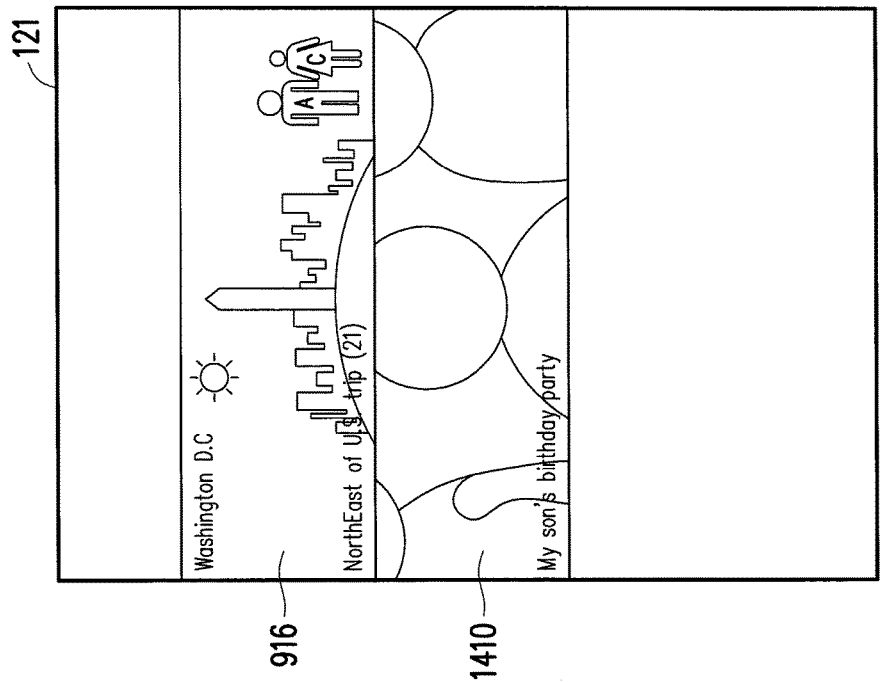
Figure 13:
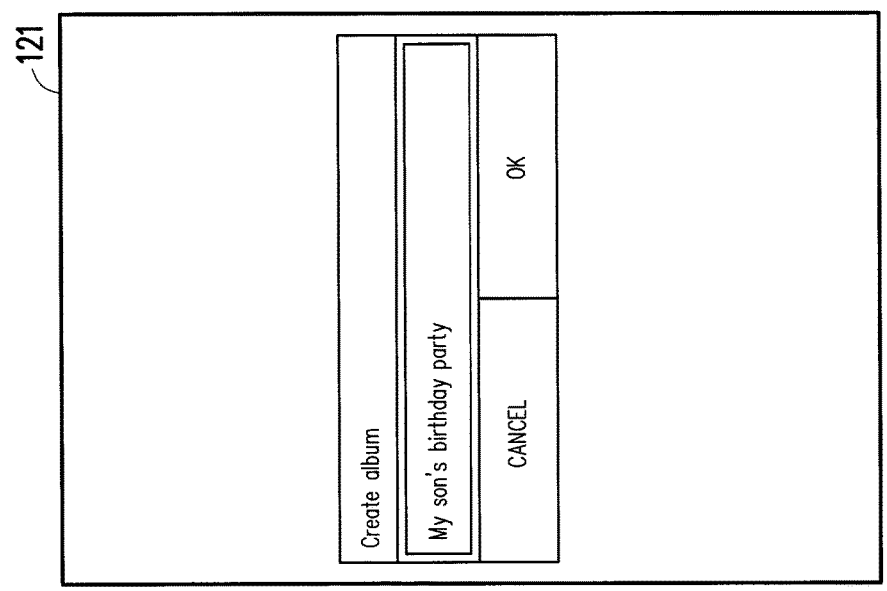

With reference to FIG. 13, after the save option 750 is selected, user may be prompted to insert a title for the collection album. With reference to FIG. 14, a smart album is displayed listing the saved collection album. In the exemplary embodiment, the relevant images corresponding to the child J's birthday be grouped together, which may be viewed again by selecting an icon 1410 representing the child J's birthday illustrated in FIG. 14. Since the query concept is child J's birthday in every year, new images that satisfies the query concept would be automatically grouped to this smart album corresponding to the child J's birthday.

Figure 15:
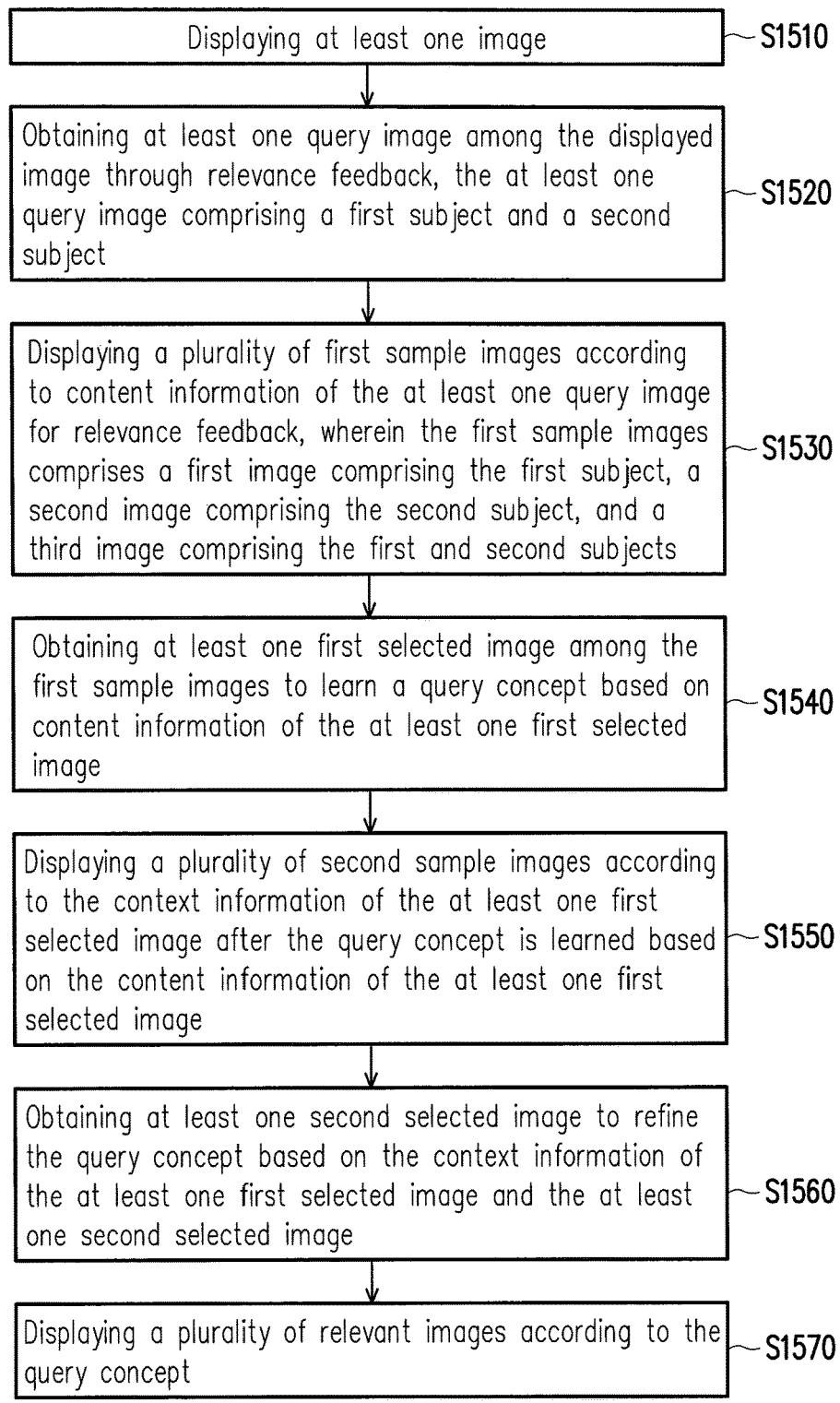
FIG. 15 is a flow diagram illustrating a method of an user interface for searching relevant images via active learning according to one of the exemplary embodiments of the disclosure.

FIG. 15 is a flow diagram illustrating a method of a user interface for searching relevant images via active learning according to one of the exemplary embodiments of the disclosure.

With reference to FIG. 15, in step S1510, at least one image is displayed.

In step S1520, at least one query image(s) among the displayed image is obtained through relevance feedback, where the at least one query image includes a first subject and a second subject.

In step S1530, a plurality of first sample images is displayed according to content information of the at least one query image for relevance feedback. The first sample images comprise a first image comprising the first subject, a second image comprising the second subject, and a third image comprising the first and second subjects.

In step S1540, at least one first selected image(s) among the first sample images is obtained to learn a query concept based on content information of the at least one first selected image.

In step S1550, a plurality of second sample images is displayed according to the context information of the at least one first selected image after the query concept is learned based on the content information of the at least one first selected image.

In step S1560, at least one second selected image(s) is obtained to refine the query concept based on the context information of the at least one first selected image and the at least one second selected images.

In step S1570, a plurality of relevant images is displayed according to the query concept.

In summary, the disclosure provides a method and a user interface for searching a plurality of relevant images via active learning adapted to an electronic device. In the disclosure, a plurality of relevant images among the stored images may be searched and grouped into a collection album. In detail, the query concept may be learned based on content information of a query image, and then refined based on the context information based on the query image and at least one selected image(s) associated to the query image in content information. Then, the relevant images are searched among the stored images according to the refined query concept (including content and context), and then the relevant images may be grouped into a collection album.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of searching relevant images via active learning, adapted for a mobile electronic device comprising a plurality of stored images, comprising:
   obtaining a query image comprising a first subject and a second subject, wherein the query image initiates a process of searching a plurality of relevant images;
   learning a query concept based on content information of the query image by:
      sampling a plurality of first sample images from the stored images according to the content information of the query image, wherein the content information is extracted from content-related metadata of the query image;
      providing the first sample images for selection, wherein the first sample images comprising an image having the first subject, an image having the second subject, and an image having both the first and second subjects;
      obtaining a first selected image selected from the first sample images; and
      determining the content information of the first selected image as the query concept;
   refining the query concept based on context information of the first selected image extracted from context-related metadata by:
      sampling a plurality of second sample images from the stored images according to context information of the first selected images for selection;
      obtaining a second selected image selected from the second sample images; and
      determining the context information of the second selected image as the query concept in addition to the content information of the first selected image; and
   searching the relevant images among the stored images according to the query concept and grouping the relevant images into a collection album.

2. The method of claim 1, wherein learning the query concept based on the content information further comprises:
   iteratively sampling another set of first sample images from the stored images according to content information of the first selected image obtained from the set of the first sample images of previous iteration of the first sample images for learning of the query concept iteratively; and
   learning the query concept according to the content information of the first selected images obtained from each iteration of the learning of the query concept.

3. The method of claim 2, wherein learning the query concept according to the content information of the first selected images obtained by iteratively sampling another set of the first sample images until a number of the first selected images exceeds a first predetermined value, wherein the set of the first sample images are sampled according to the content information of the first selected images obtained from the first sample images of the previous iteration.

4. The method of claim 1, wherein refining the query concept based on the context information further comprises:
iteratively sampling another set of the second sample images from the stored images according to context information of the second selected image obtained from the set of the second sample images of previous iteration; and
refining the query concept based on the context information of the second selected images obtained from each iteration of relevance feedback of the second sample images.

5. The method of claim 1, wherein the context information comprises temporal information having time, date, year information, and the query concept is refined based on the temporal information of the query image and a second selected image among the second sample images.

6. The method of claim 1, wherein the context information comprises location information, and the query concept is refined based on the location information of the query image and a second selected image among the second sample images.

7. The method of claim 1, wherein the context information comprises temporal and location information, and the query concept is refined based on the temporal and location information of the query image and a second selected image among the second sample images.

8. An electronic device, comprising:
a display unit;
a storage device, storing a plurality of stored images; and
a processor, configured for:
obtaining a query image comprising a first subject and a second subject, wherein the query image initiates a process of searching a plurality of relevant images;
learning a query concept based on content information of the query image by:
sampling a plurality of first sample images from the stored images according to the content information of the query image, wherein the content information is extracted from content-related metadata of the query image;
providing the first sample images for selection, wherein the first sample images comprising an image having the first subject, an image having the second subject, and an image having both the first and second subject;
obtaining a first selected image selected from the first sample images; and
determining the content information of the first selected image as the query concept; and
refining the query concept based on context information of a plurality of first selected images extracted from context-related metadata by:
sampling a plurality of second sample images from the stored images according to context information of the first selected images for selection;
obtaining a second selected image selected from the second sample images; and
determining the context information of the second selected image as the query concept in addition to the content information of the first selected image; and
searching the relevant images among the stored images according to the query concept and grouping the relevant images into a collection album.

9. The electronic device of claim 8, wherein the processor is further configured for:
iteratively sampling another set of sample images from the stored images according to content information of the first selected image obtained from the set of the first sample images of previous iteration of the first sample images for learning of the query concept iteratively; and
learning the query concept according to the content information of the first selected images obtained from each iteration of the learning of the query concept.

10. The electronic device of claim 9, wherein the processor is configured for learning the query concept according to the content information of the first selected images obtained by iteratively sampling another set of the first sample images until a number of the first selected images exceeds a first predetermined value, wherein the set of the first sample images are sampled according to the content information of the first selected images obtained from the first sample images of the previous iteration.

11. The electronic device of claim 8, wherein the processor is further configured for:
iteratively sampling another set of the second sample images from the stored images according to context information of the second selected image obtained from the set of the second sample images of previous iteration; and
refining the query concept based on the context information of the second selected images obtained from each iteration of relevance feedback of the second sample images.

12. The electronic device of claim 8, wherein the context information comprises temporal information having time, date, year information, and the query concept is refined based on the temporal information of the query image and a second selected image among the second sample images.

13. The electronic device of claim 8, wherein the context information comprises location information, and the query concept is refined based on the location information of the query image and a second selected image among the second sample images.

14. The electronic device of claim 8, wherein the context information comprises temporal and location information, and the query concept is refined based on the temporal and location information of the query image and a second selected image among the second sample images.

15. A user interface for search relevant images, adapted to an electronic device comprising a displaying unit and an input unit, the user interface is configured at least to:
display an image;
obtain a query image among the displayed image through relevance feedback, the query image comprising a first subject and a second subject, wherein the query image initiates a process of searching a plurality of relevant images;
display a plurality of first sample images according to content information of the query image for a user to select, wherein the first sample images comprise a first image comprising the first subject, a second image comprising the second subject, and a third image comprising the first and second subjects;
obtain a first selected image selected among the first sample images and determining the content information of the first selected image to be a query concept;
display a plurality of second sample images according to context information of the first selected image for the user to select and refining the query concept by including the context information of the second selected image in addition to the content information of the first selected image; and display a plurality of relevant images according to the query concept.

16. The user interface of claim 15, further comprising:
iteratively displaying another set of the first sample images according to content information of a first selected image obtained in a previous iteration until a number of the first selected images exceeds a first predetermined value.

17. The user interface of claim 15, wherein the context information comprises time information, date information, and year information, the displayed second sample images comprise images having different year information.

18. The user interface of claim 15, wherein the context information comprises location information.

19. The user interface of claim 15, further comprising:
iteratively displaying another set of the second sample images according to context information of the second selected image obtained in a previous iteration.

* * * * *